United States Patent
Capek et al.

(10) Patent No.: US 7,219,074 B2
(45) Date of Patent: May 15, 2007

(54) SYSTEM AND METHOD FOR OBTAINING ITEMS AT A TRAVELER'S DESTINATION

(75) Inventors: Peter G. Capek, Ossining, NY (US); Dimitri Kanevsky, Ossining, NY (US); Sara H. Basson, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/854,613

(22) Filed: May 14, 2001

(65) Prior Publication Data

US 2002/0169682 A1 Nov. 14, 2002

(51) Int. Cl.
*G06Q 30/00* (2006.01)

(52) U.S. Cl. ......................... 705/26; 206/534

(58) Field of Classification Search ............... 705/26; 206/534
See application file for complete search history.

(56) References Cited

U.S. PATENT DOCUMENTS

| | | | | |
|---|---|---|---|---|
| 4,775,935 A | * | 10/1988 | Yourick ..................... | 364/401 |
| 5,393,964 A | * | 2/1995 | Hamilton et al. ........... | 235/381 |
| 5,422,809 A | * | 6/1995 | Griffin et al. .............. | 364/407 |
| 5,724,520 A | * | 3/1998 | Goheen ..................... | 395/205 |
| 5,732,398 A | * | 3/1998 | Tagawa ...................... | 705/5 |
| 5,832,451 A | * | 11/1998 | Flake et al. ................ | 705/5 |
| 5,948,040 A | * | 9/1999 | DeLorme et al. ........... | 701/201 |
| 5,960,411 A | * | 9/1999 | Hartman et al. ............. | 705/26 |
| 5,983,200 A | * | 11/1999 | Slotznick ..................... | 705/26 |
| 6,058,373 A | * | 5/2000 | Blinn et al. .................. | 705/26 |
| 6,134,532 A | * | 10/2000 | Lazarus et al. .............. | 705/14 |
| 6,134,534 A | * | 10/2000 | Walker et al. ............... | 705/26 |
| 6,227,371 B1 | * | 5/2001 | Song .......................... | 206/534 |
| 6,408,307 B1 | * | 6/2002 | Semple et al. ........... | 707/104.1 |
| 6,415,291 B2 | * | 7/2002 | Bouve et al. ................ | 707/10 |

FOREIGN PATENT DOCUMENTS

| | | | | |
|---|---|---|---|---|
| EP | 122040 | * | 10/1984 | ................. 705/26 |
| JP | 10-97651 | * | 10/1998 | |

OTHER PUBLICATIONS www.southwest.com/cgi-bin/buildItin, Southwest Airlines, *Ticketless Travel Center*, 1999, 2002.*
Contra Costa Times, *California Based Internet Startup Commerce One Plan IPO Soon*, Feb. 11, 1999.*
U.S. Airways, *US Airways Team Up With Sidestep*, News Release, Dec. 18, 2000.*
www.travelocity.com, home page, pp. 1-3, 2001.*
EXPEDIA.COM web age 1999.*

* cited by examiner

*Primary Examiner*—Joseph A. Fischetti
(74) *Attorney, Agent, or Firm*—Rafael Perez-Pineiro (57) ABSTRACT

A method for providing a service for a traveler to acquire at least one item at the traveler's destination, comprising the steps of receiving a request from a traveler for obtaining at least one item; providing the traveler with the option to one of rent and purchase the at least one item, arranging for the at least one item to be supplied, arranging for shipping of the at least one item to a location selected by the traveler at a time selected by the traveler; and conducting a transaction with the traveler for obtaining the at least one item.

21 Claims, 5 Drawing Sheets

SYSTEM AND METHOD FOR OBTAINING ITEMS AT A TRAVELER'S DESTINATION

BACKGROUND OF THE INVENTION

1. Field of the Invention

The present invention relates to a system and method for providing a service to travelers. In particular, this invention relates to a system and method for providing a service to a traveler to acquire at the traveler's destination site items that are typically carried in the traveler's luggage.

2. Description of the Related Art

In today's society there is a high volume of travelers traveling long distance. For example, nearly a million people travel by air every day, just in the United States. The Department of Transportation's Office of International Aviation reports that nearly 97 million passengers traveled by air between the United States and the rest of the world during calendar year 1994. A significant fraction of these passengers (almost half of US domestic travelers) are traveling for business, and many business travelers make many air trips in a year.

Most people travel with luggage. Traveling, such as by air, train, car, boat, and bus, with luggage presents problems, both for the traveler and for the travel provider. For example: travelers are apt to forget to include items in their luggage when packing; certain items to be packed are not conducive to travel as they tend to spill, explode or be spoiled during travel (for example, shampoo, cosmetics, lotions, medications etc.); certain items to be packed must, in order to be practical, be bought in travel sizes (for example irons, etc.) that are inconvenient to use and buy; business travelers traveling on short notice might prefer to leave from their office, and travel directly to a terminal without going home to pack luggage; travelers having special health concerns, such as those who are frail or handicapped, may find it difficult to carry even a minimum of luggage or impossible to carry luggage altogether and furthermore may have additional luggage due to medical equipment and medications; travelers may want to avoid traveling with expensive items such as laptop computers, cash or jewelry, as they may pose a risk of being stolen; travelers traveling to a climate which is very different from where they live may be forced to acquire clothing that they will need only while staying at that destination, such as when traveling from a hot, humid climate to one with a cold winter. Winter clothing acquired for travel may be bulky and cumbersome and require an additional piece(s) of luggage. The table shown at http://www.bts.gov/oai/international/calyr94.htm shows that much travel occurs between the U.S. and other countries in different climate zones. For such trips travelers need to acquire items such as clothing that may be needed only for the time of their stay in a different geographic zone. The traveler might prefer not to buy items that will only be used for a short time during their travels. This consideration is exacerbated in that items suitable for the destination may simply not be available at the point of origin, or at least, not available proximate to the time of travel due to the desire of merchants to use their selling space for seasonally appropriate items.

Figure 3A:
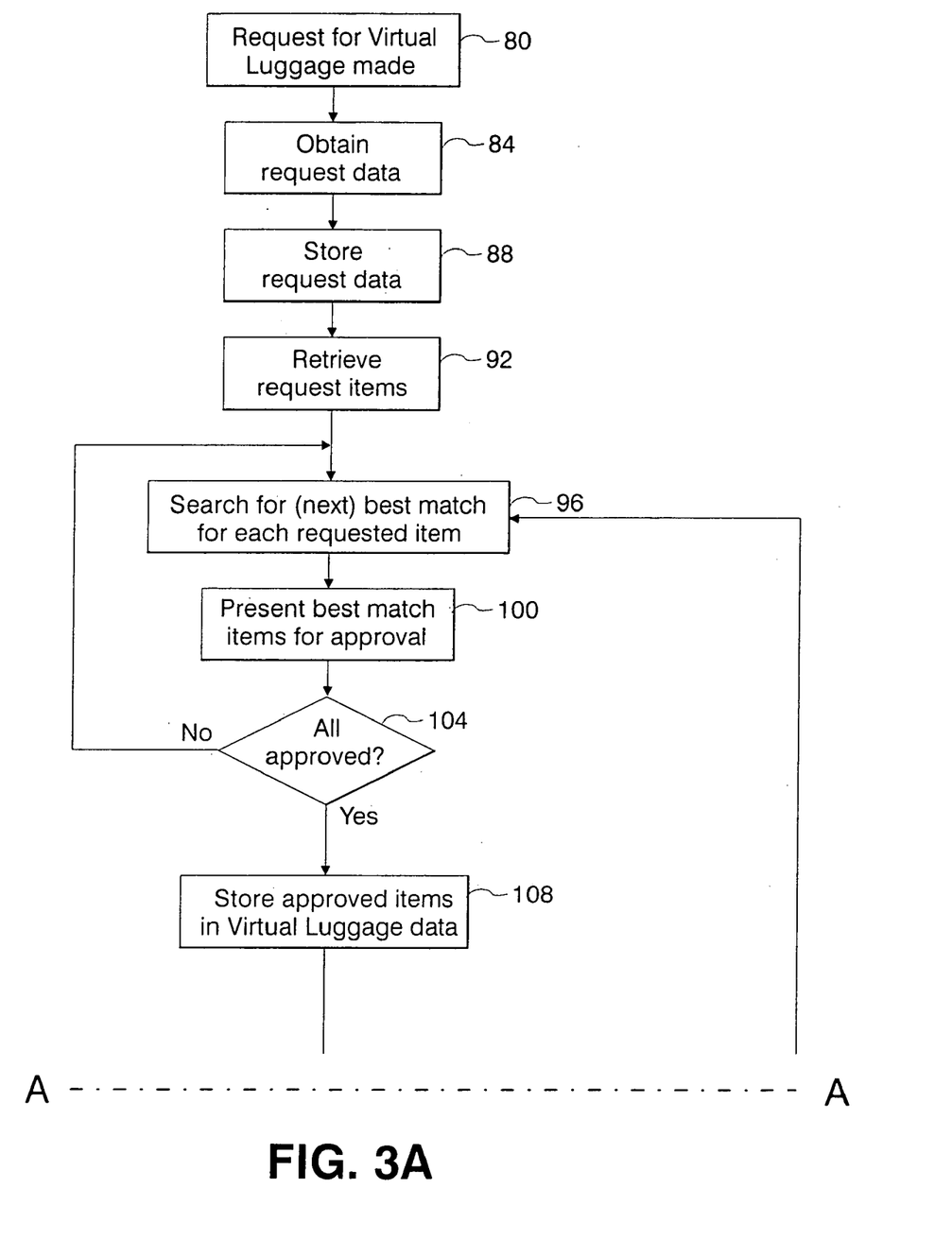
FIG. 3 is a flowchart of processing performed by the virtual luggage server in accordance with a preferred embodiment of the present invention.
Figure 3B:
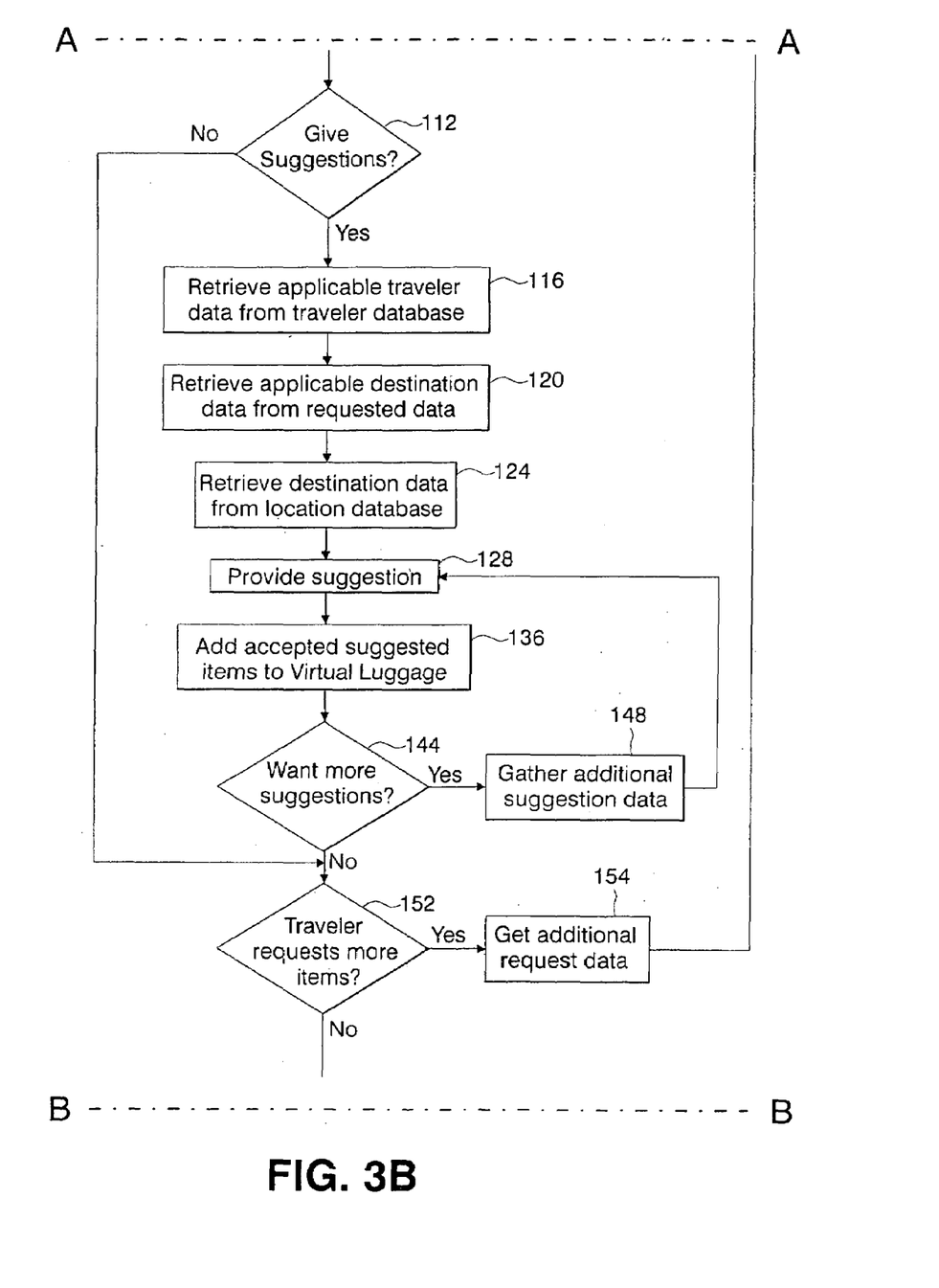
Figure 3C:
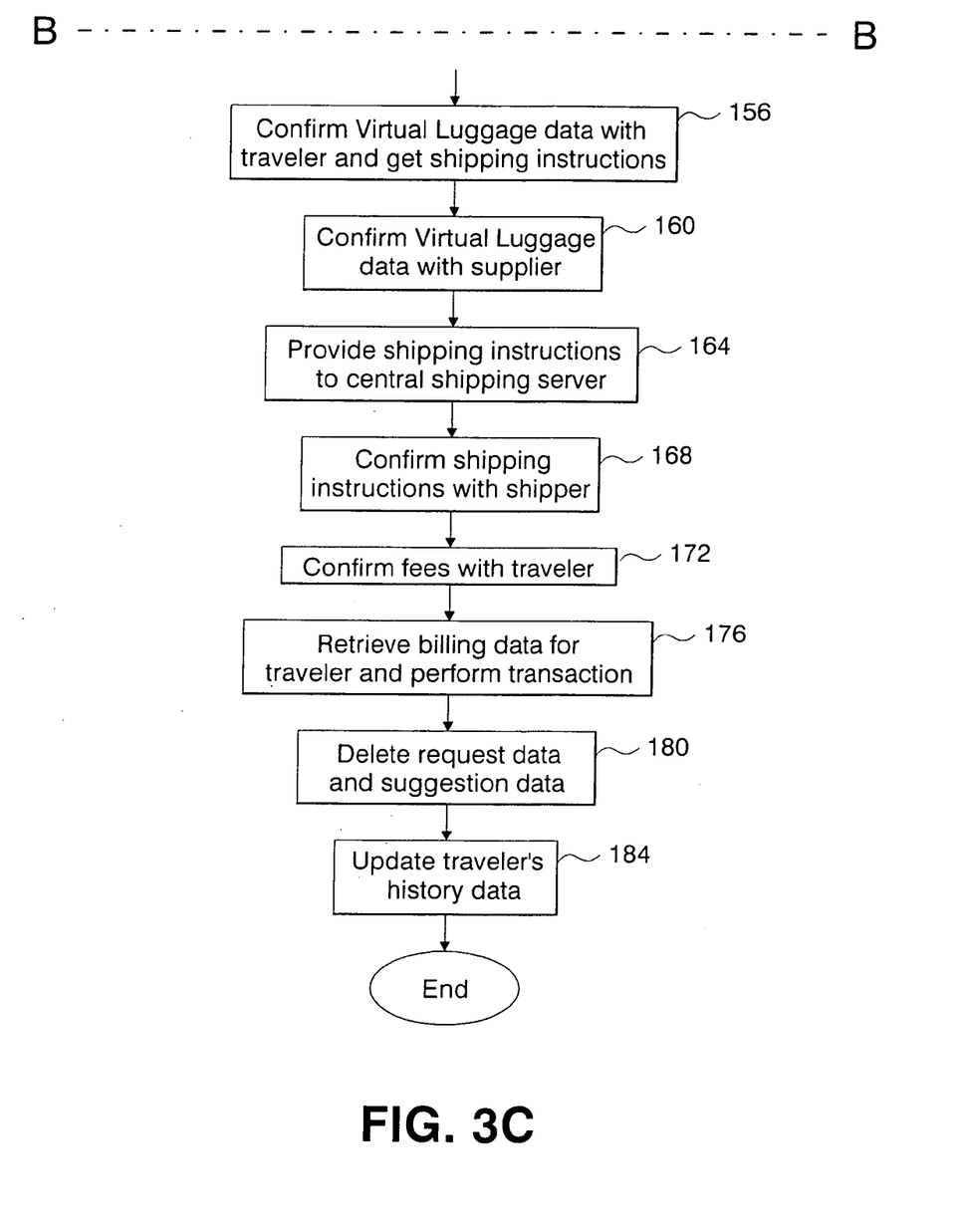

FIGS. 3A–C is a flowchart of processing performed by the virtual luggage server in accordance with a preferred embodiment of the present invention.

Problems associated with travel with checked-in luggage include, for example: an increase in travel time due to requiring an earlier arrival at the origin airport than would otherwise be necessary; an increase in travel time due to a delayed departure from the destination airport due to waiting for baggage to be delivered; the checked-in luggage occupying storage space in the carrier's hold that could more profitably be used to carry freight; and the checked-in luggage being lost, stolen or sent in error to the wrong destination. In January of 1998 there were 211,353 reports of stolen, damaged or misplaced luggage per 35,005,471 passengers that were carried by 10 major American airlines. On average, 6.04 passengers per 100 reported problems with luggage.

Therefore, there is a need for a system and a method for eliminating the need for travelers to travel with luggage or to minimize the amount of luggage.

SUMMARY OF THE INVENTION

One aspect of the present invention is to provide a system and a method for providing a service to travelers to acquire at the traveler's destination site items normally packed in the traveler's luggage by prearranging rental, purchase and delivery of the items to the traveler at his destination.

Another aspect of the present invention is to provide a system and a method for providing a service for a traveler to select the items.

It is another aspect of the present invention to provide an interactive world wide web based service for maintaining a history for each traveler and allowing interactive selection of desired items to be rented and purchased.

It is another aspect of the present invention to provide a means for a traveler to state his preferences about styles and colors of clothing and other articles, so that the traveler may easily arrange to have articles delivered with minimal additional effort immediately preceding a trip.

It is yet another aspect of the present invention to provide a method and a system for providing specialized service for handicapped travelers such as the blind to aid in the selection, and provide a method for labeling and packing of items being purchased and rented by the traveler.

It is another aspect of the present invention to provide a method in which suppliers advertise, or provide as samples, items that are available to be bought and rented by travelers.

It is still another aspect of the present invention to provide a method for promoting use of the service to purchase and rent items by discounting other related traveling expenses such as travel tickets and hotel expenses.

To fulfill the above and other aspects, a system and method is provided for a traveler to acquire at the traveler's destination items typically packed in luggage comprising the steps of: receiving a request from a traveler for obtaining at least one item; providing the traveler with the option to one of rent and purchase the item; arranging for the at least one item to be delivered; arranging for delivery of the at least one item to a location selected by the traveler at a time selected by the traveler; and conducting a transaction with the traveler for obtaining at least one item.

BRIEF DESCRIPTION OF THE FIGURES

The foregoing and other objects, aspects and advantages will be better understood from the following detailed description of preferred embodiments of the invention with reference to the following drawings.

DETAILED DESCRIPTION OF THE PREFERRED EMBODIMENTS

Figure 1:
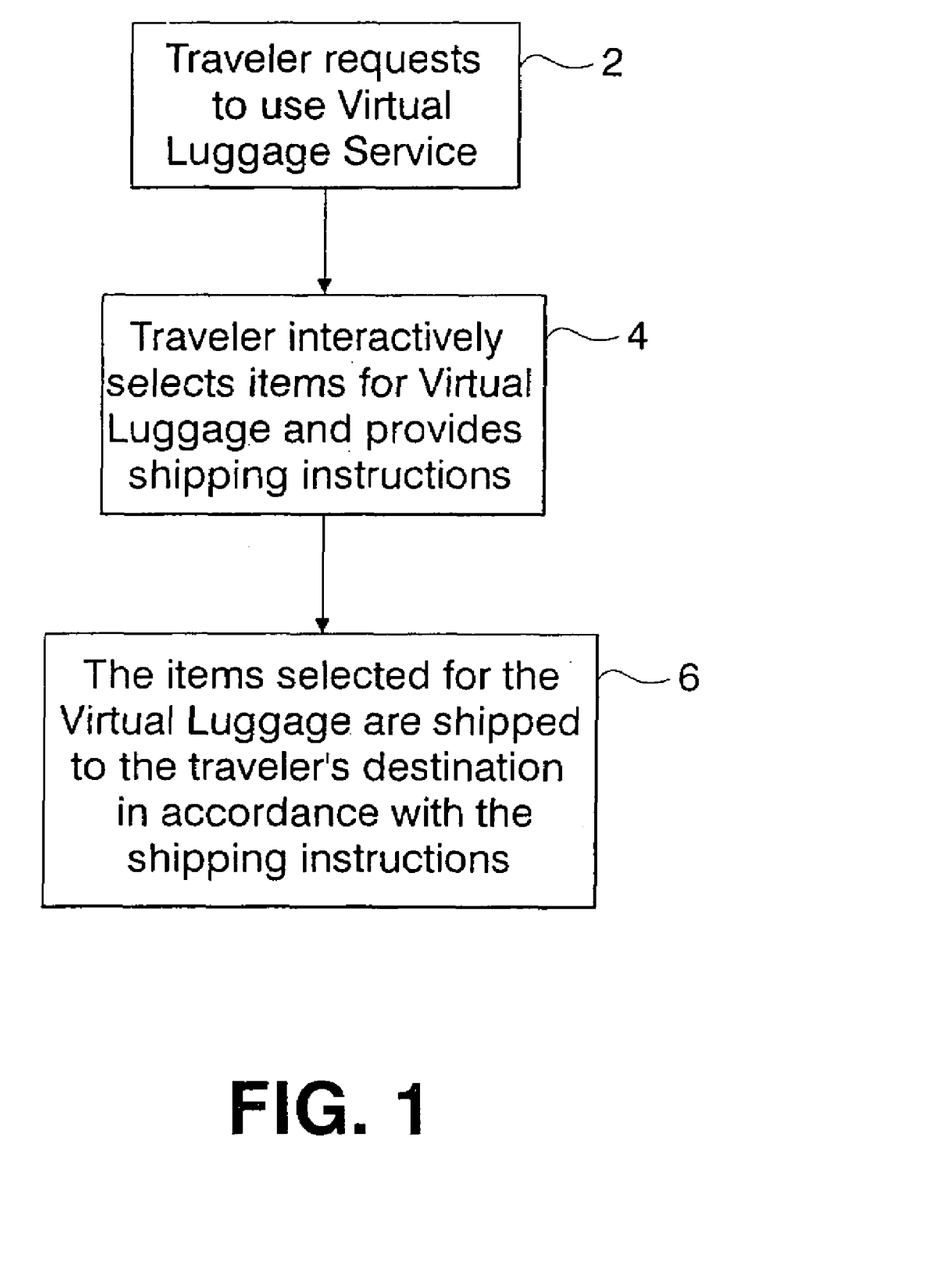
FIG. 1 is a flowchart of a method in accordance with a preferred embodiment of the present invention.

A method of obtaining items at a traveler's destination according to a preferred embodiment of the present invention is shown in FIG. 1. At step 2 a traveler submits a request to use a service for obtaining items at a traveler's destination. At step 4 the traveler, interactively with the virtual luggage service provided, selects items to be included as the contents of the virtual luggage and provides instructions for the delivery of the selected items. At step 6 the selected items are delivered to the traveler's travel destination in accordance with the traveler's delivery instructions.

Figure 2:
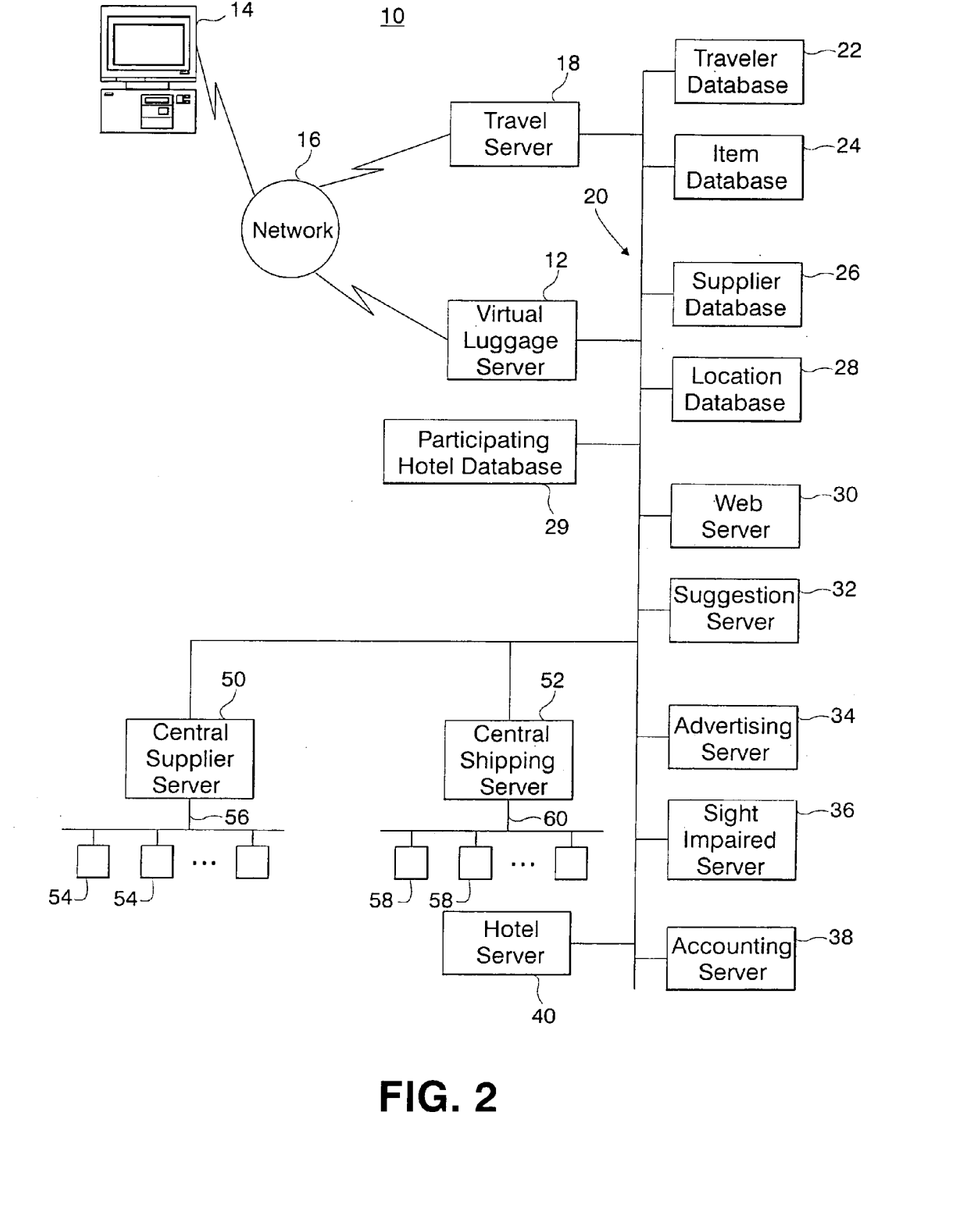
FIG. 2 is a block diagram of a system in accordance with a preferred embodiment of the present invention.

An embodiment of a system 10 of the present invention is shown in FIG. 2. A virtual luggage server 12 is shown in communication via network 16 with a computer terminal 14 operated by a traveler (user) or representative of the traveler. The computer terminal 14 is further in communication with a travel server 18 via network 16. In the preferred embodiment the network 16 is the Internet. The computer terminal 14 is provided with a world wide web browser for accessing the Internet. The virtual luggage server 12 and the travel server 18 provide websites that the computer terminal can access via its Internet connection. In the preferred embodiment, the virtual luggage server 12 and the travel server 18 provide hyperlinks to one another, so that the traveler can easily access the website of one of the virtual luggage server 12 and the travel server 18 from the other. The virtual luggage server 12 and the travel server 18 are preferably networked to one another by secured network 20, an intranet, in addition to the Internet network 16. Secured network 20 is inaccessible to a computer such as computer terminal 14 that is not connected to the network 20.

The virtual luggage server 12 is further in communication with a traveler database 22, an item database 24, a supplier database 26, a location database 28, a participating hotel database 29, a web server 30, a suggestion server 32, an advertising server 34, a sight impaired server 36, an accounting server 38, a hotel server 40, a central supplier server 50 and a central shipping server 52 via secured network 20. In the preferred embodiment the virtual luggage server 12 has access to all of the databases of the system 22, 24, 26, 28, 29 and the servers 18, 30, 32, 34, 36, 38, 40, 50, and 52 via network 20. However, access between each of the databases and servers of network 20 may be limited to any configuration in accordance with security and confidentiality issues as is known in the art. For example, travel server 18 may only be in communication with the virtual luggage server 12 or alternatively may be allowed access to selected databases while not having access to the other servers.

The traveler database 22 stores information on travelers that have registered and/or used the service provided by the virtual luggage server. Information stored on each traveler includes, for example, name data; billing data; shipping data; history data of previous travels including when, where and what items were included in virtual luggage; personal data for personalizing items such as size, height, weight, choice of colors, activities most likely to be engaged in during travel; and other related preferences. The history data may include stored images of previously provided items.

The item database 24 stores data on items available for selection for inclusion in the virtual luggage. The data may include name; description; suppliers that can supply it; and the available inventory.

The supplier database 26 stores data on the suppliers that supply items for virtual luggage. The stored data may include name; location; specialty; current sale promotions; and financial information.

The item database 24 and/or the supplier database 26 may be stored, accessed and/or maintained by the central supplier server 50 and/or the virtual luggage server 12.

The location database 28 stores data on worldwide locations for providing information to travelers about their destination location. Data may include seasonal weather information including expected precipitation, local trends including fashion, available activities, etc.

The participating hotel database 29 stores data on hotels participating in the virtual luggage service. Data may include name; location; contact information; service options; special services available; and constraints.

The web server 30 is a World Wide Web server that delivers web pages to client computers. The web pages are preferably in HTML (Hypertext Mark-up Language), but could be in any mark-up language decipherable by the browsers being used on the network. In this embodiment, data is retrieved from and posted to other web servers using a gateway interface such as CGI (Common Gateway Interface).

In the preferred embodiment the central supplier server 50 communicates with a plurality of local supplier servers 54 via a secured network 56. The secured network 56 may be configured, for example, to allow only access between the central supplier server 50 and each of the local supplier servers 54, or alternatively to further allow access between selected or all of the local supplier servers 54. The local supplier servers 54 may be distributed worldwide. Each of the local supplier servers 54 may be actual suppliers that supply items to users of the virtual luggage service, or may access a new collection of at least one local supplier server. In other exemplary embodiments there is only one local supplier server 54, or alternatively the central supplier server 50 is the supplier.

The central supplier server 50 consults, maintains and updates the item database 24. When searching for an item for a particular traveler the central supplier server 50 selects a local supplier server 54 as the most suitable for the traveler, such as in accordance with the destination location and item availability. A local database associated with the selected local supplier may be consulted.

In the preferred embodiment the central shipping server 52 communicates with a plurality of local shipping servers 58 via a secured network 60. The secured network 66 may be configured, for example, to allow only access between the central shipping server 52 and each of the local shipping servers 58, or alternatively to further allow access between selected or all of the local shipping terminals 58. The local shipping servers 58 may be distributed worldwide. Each of the local shipping servers 58 may be actual shippers that deliver items to users of the virtual luggage service, or may access a new collection of at least one local shipping server 58. In other exemplary embodiments there is only one local shipping server 58, or alternatively the central shipping server 52 is the shipper.

In other embodiments any combination of the networks 16, 20, 56 and 60 may be combined into a single network. For example, the Internet may be used for all of the networks of system 10. Any combination of the networks of system 10 may be comprised of additional network(s). Preferably security measures such as firewalls, encryption/decryption methods, Secure Sockets Layer (SSL), etc. as are known in the art are used to provide confidentiality and security as needed for sensitive data such as financial records, personal data, competitor prices and actual transactions. Various levels of confidential and secure information may be provided within or between networks, databases and servers such as by password protection.

In the preferred embodiment a traveler accesses the service provided by the virtual luggage server 12 by accessing a virtual luggage website via the Internet. The traveler may also contact the virtual luggage server directly or via an intermediary, by telephone, facsimile, electronic mail, by person to person contact at a predetermined location such as a store etc. The virtual luggage website is preferably configured to provide service to all travelers, or may be limited to travelers using another service such as a travel service provided by the travel server 18. Access to the virtual luggage service may be restricted to access via a link such as a hyperlink to the virtual luggage website from a website associated with a participating service or vice-versa. Access may also (or only) be provided via direct access to the virtual luggage website.

In a preferred embodiment, the virtual luggage service provided by the virtual luggage server 12 requires a traveler accessing the service for the first time to register with the service by providing the service with financial and/or personal data. The virtual luggage server 12 creates an entry in the traveler database 22 for the registered traveler and stores the data provided at registration in the traveler database 22 in association with the newly registered traveler.

An examplary procedure followed by the virtual luggage server 12 in accordance with a preferred embodiment of the present invention is shown in FIGS. 3A–C, wherein FIGS. 3A–C are joined by lines A—A and B—B. At step 80 a request for virtual luggage is made by a traveler user via the web server 30. At step 84 the web server 30 obtains request data from the traveler. The request data includes item data pertaining to the items requested to be included in the virtual luggage and destination data including the designated destination site and time of arrival for the virtual luggage. The item data includes actual item selections or item descriptions. The traveler has the ability to browse the item database 24, such as by viewing lists or images of the items stored, in order to select items. The request data further includes general or "summary" requests such as requesting complete virtual luggage for cases in which the traveler is traveling substantially without any actual luggage; information pertaining to the traveler's planned trip such as dates, itinerary, etc.; nature of trip (business, leisure, etc.). The request data may further include digital photographs of items that the traveler would like to be included in his virtual luggage. At step 88 the request data is temporarily stored by the virtual luggage server 12.

At step 92 the item data is retrieved from the request data. At step 96 the item database 24 is consulted and searched for the item that best matches (best match item) each requested item. At step 100 the web server 30 presents the best match items, such as by presenting an image and/or a description of the items, to the traveler for the traveler's approval. The consultation of the item database 24 may be done by the virtual server 12 or by the central supplier server 50. The item database 24 may be a central database maintained and updated by the central supplier server 50.

At step 104 a decision is made if the best match items were approved. If not, control returns to step 96 and a search is made for the next best match for the item data for which a best match was not approved. Once all of the best-matched items are approved or eliminated control goes to step 108. At step 108 the approved best matches are stored as virtual luggage data.

At step 112 a determination is made if the traveler wants the virtual luggage server 12 to provide suggestions for items to be included in the virtual luggage. The determination may be made by querying the traveler via the web server 30 or using other factors such as traveler entered data provided at registration or initiating the current request. If it is determined that the traveler does not want suggestions then control skips to step 152.

Otherwise, at step 116 control is passed to the suggestion server 32, which consults the traveler database 22 and retrieves information associated with the traveler that is applicable for providing suggestions. Applicable information includes, for example, history data and personal data. At step 120 the suggestion server 32 accesses the destination data. At step 124 the suggestion server 32 retrieves information associated with the location of the traveler's destination from the location database 28. The data retrieved at steps 116–124 is temporarily stored as suggestion data.

At step 128 the suggestion server 32 uses the suggestion data to provide suggestions to the traveler via the web server 30. The suggestion server 32 may further consult the item database 22 and/or the central supplier server 50 for providing suggestions. Suggested items may be presented to the traveler via the web server 30 such as by providing images and/or descriptions of the items. Suggested items may be retrieved from other merchants, such as for example Amazon.com which allows a consumer to maintain a "wishlist" of items desired by the consumer. At step 136 each suggested item accepted by the traveler is added to the virtual luggage. The process of gathering suggestion data and providing suggestions is preferably interactive and proceeds until the traveler is satisfied with the items he has selected for his virtual luggage. For example, a determination is made at step 144 if the suggestion process is completed. If not, at step 148 additional suggestion data is gathered and control returns to step 128. Additional suggestion data may be obtained from the traveler via the web server 30, from the traveler, item and location databases 22, 24, 28 respectively, or agents such as operators and/or intelligent processors that gather data from other sources.

Once the suggestion process is completed a determination is made at step 152 as to whether or not the traveler has completed the process of selecting items for the virtual luggage. If not, at step 154 the web server 30 obtains the additional request(s), and control returns to step 96.

Once the traveler has completed selecting items for the virtual luggage, at step 156 via the web server 30, the traveler confirms the items included in the virtual luggage and the traveler provides delivery instructions for each item to the central shipping server 52 at step 164. Delivery instructions may include for example: providing the item (such as a winter coat) at the terminal at the time of arrival; providing the item at the hotel; placing it in the hotel room such as by hanging it in the closet or placing it in the drawers; and return arrangements such as cleaning of items before returning, pick-up for rented items, and shipping purchased items to the traveler's home once the traveler departs from the destination.

The hotel server is used to access the participating hotel database 29 for coordinating the services provided by the virtual luggage service with participating hotels and other traveler accommodations such as cruise ships. Arrangements may be made to deliver virtual luggage directly to the hotel room of the traveler at the traveler's destination, unpack the virtual luggage and store the virtual luggage appropriately in the bureau, closet etc. of the hotel room.

At step 160 the approved virtual luggage is confirmed with the central supplier server 50. In the preferred embodiment, the central supplier server 50 obtains confirmation from the actual supplier. At step 164 the delivery instructions are provided to the central shipping server 52. The central shipping server 52 selects a local shipping server 54 in accordance with locality, availability, etc. to handle each item and provides it with the delivery instructions. At step 168 the virtual luggage server 12 confirms the shipping instructions and fees with the central shipping server 52, which obtains confirmation from the actual shipper. At step 172 the delivery instructions and fees for the virtual luggage are confirmed with the traveler via the web server 30. At step 176 the accounting server 38 consults the financial data of the traveler in the traveler database 22 and transacts the transaction for the purchase/renting of the virtual luggage items and the shipping, and supplies transaction data to the traveler, shipper and supplier. The transaction is preferably handled by the central supplier server 50 and the central shipping server 52, which in turn each handle the transaction with the respective supplier(s) and shipper(s).

The accounting server 38 accesses billing data for travelers, suppliers and shippers and any other clients and vendors associated with the virtual luggage service for executing transactions and tracking billing and payments of bills.

At step 180 the temporary request data and the temporary suggestion data are deleted. At step 184 the history data stored in the traveler database 22 associated with the traveler is updated.

The advertising server 34, sight impaired server 36, accounting server 38, and the hotel server 40 are accessed by the virtual luggage server 12 to provide additional features to the service provided by the system 10. The advertising server 34 interacts with the suppliers, shippers and with participating hotels for arranging advertising schemes and reciprocity schemes for attracting users to the virtual luggage service and for making it profitable for suppliers, shippers and hotels to participate in the service. For example, suppliers may be provided with the opportunity to advertise by providing selected samples of their product(s) to selected travelers. In another example air tickets or hotel fees are reduced for travelers using the virtual luggage service.

The sight-impaired server 36 provides additional service to the traveler in need. The sight-impaired server 36 provides descriptive explanations, by means of spoken words, of the images being presented to the traveler from the item database 24 or by the traveler. The sight impaired server 36 further enables the traveler to provide additional instructions to the supplier and/or shipper for labeling and packing of the items selected to be included in the virtual luggage so that the traveler will be able to identify the items. Such labeling would normally include tags printed in Braille or other appropriate means.

The virtual luggage server 12 provides a service to travelers for arranging rental and/or purchase of items selected by the traveler as well as delivery of the selected items to a destination location of the traveler for eliminating or reducing the amount of baggage taken when traveling. A group of selected items is referred to as virtual luggage. In the preferred embodiment the virtual luggage server 12 further provides the traveler with assistance in selecting the items. The service provided by the virtual luggage server 12 is practical for all types of travel including by car, train, bus, ship and airplane, for carry-on and checked luggage and can provide specialized service such as for sight impaired travelers, travelers with infants and travelers with medical needs.

The virtual luggage service has potential benefits for all participants in the service. For example, the service can be implemented for world wide travel and prove profitable for participating vendors such as suppliers, shippers, hotels and travel providers. The virtual luggage service may be used by travelers to arrange for items needed at the traveler's destination site that are difficult or inconvenient to travel with. For example the service may be used to purchase in advance gifts for recipients at the traveler's destination site, purchase foreign currency in advance, arrange for purchase or rental of medical equipment, medications, valuable items such as laptops and jewelry, items ordinarily ordered such as by catalogue, baby equipment, etc. For example, a traveler may include a rented laptop in his virtual luggage. The traveler would upload the contents of his personal computer for storage at an internet site. Upon obtaining a rented laptop in his virtual luggage, he would download from the internet the stored contents of his personal computer, and store them on the rented laptop he obtained via the virtual luggage service. Furthermore, the service provides the traveler with versatility in acquiring items that are not needed for long term, such as clothing seasonally or fashionably appropriate for the destination but not for the traveler's home environment. The virtual luggage service potentially saves travelers time and money while generating new worldwide markets. The virtual luggage service further provides for return shipment of the virtual luggage as requested by the traveler for when the traveler no longer needs the virtual luggage. The virtual luggage service arranges for shipping purchased items to a location selected by the traveler, such as the traveler's home. The virtual luggage service arranges for return of rented items, such as to the supplier of each rented item.

While the present invention has been described with respect to a certain preferred embodiment, it should be understood that the invention is not limited to these particular embodiments, but, on the contrary, the invention is intended to cover all modifications, equivalents, and alternatives falling within the spirit and scope of the invention as defined by the appended claims.

What is claimed:

1. A method in a computerized system of providing one or more personal use items for expected use by a user to one or more destinations to which the user intends to travel, the personal use items being provided by a plurality of suppliers able to deliver the personal use items to the destination within a time frame set by the user, the method comprising the steps of:

determining by the user the personal use items needed at the one or more destinations and to be packed in a suitcase;

describing in at least one databases accessible via a network, each of the plurality of destinations to which the user can travel, each of the plurality of participating suppliers at each of said destinations, and personal use items offered by said suppliers at each of said destinations, said description of personal use items being provided by means of spoken words;

selecting a destination, personal use items, a user's time frame, and special labeling instructions presented in Braille or other tactile reading indicia;

generating, by said computerized system, at least one list of said selected personal use items picked from the plurality of items according to user's preferences, said user's time frame, availability of said personal use items, and ability of a supplier to deliver said personal use items to said destination within said user's time frame;

eliminating the personal use items contained on the at least one list from those items to be packed in the suitcase;

generating, by said computerized system, instructions as to the placement of said personal use items in placement locations at said one or more destinations indicated in advance by said user;

said computerized system communicating with said suppliers to convey information relating to said personal use items to be provided at the destination within said user's time frame, and with said special labeling instructions and in placement locations indicated in advance by said user; and said suppliers supplying said personal use items to the destination within said user's time frame, and with said special labeling instructions and in placement locations indicated in advance by said user.

2. A method as in claim 1, wherein said database further includes a description of destinations previously visited by said user.

3. A method as in claim 1, wherein said database further includes a history of items previously requested by said user.

4. A method as in claim 1, wherein said database further includes personal data of a clothing size, a height, and a weight of said user.

5. A method as in claim 1, wherein said preferences include preferred activities and preferred colors of the user.

6. A method as in claim 1, further comprising determining a fee for providing said items to the user at the destination.

7. A method as in claim 6, wherein said fee is determined by at least one server computing device used to manage said database.

8. A method as in claim 1, wherein said provided items are sold, leased, rented, loaned, and provided free to the user.

9. A method as in claim 1, further comprising a step of generating a user profile from the a database information corresponding to said user upon said user performing said selecting step.

10. A method as in claim 1, wherein said time frame indicates when said user will arrive at said destination and when said user will depart said destination.

11. A method as in claim 10, further comprising a step of forwarding said time frame to said supplier, said supplier providing said selected items at said destination within said time frame.

12. A method as in claim 1, wherein said time frame indicates when said items are to be provided at said destination.

13. A method as in claim 12, further comprising a step of forwarding said time frame to said supplier, said supplier providing said selected items at said destination within said time frame.

14. The method as in claim 1, wherein said network is selected from one of the Internet, wireless, or telephone.

15. The method as in claim 14, wherein said selecting step is performed on an interactive world wide web based service, where a history for each user is maintained and interactive selection of desired items to be rented, purchased, and delivered to the destination is performed.

16. The method as in claim 1, further comprising a step of selecting preferences including styles and colors of the items.

17. The method as in claim 1, further comprising a step of labeling and packing the chosen items.

18. The method as in claim 1, further comprising a step of discounting travel service to promote providing said items to said destination.

19. The method as in claim 1, further comprising a step of packing said items in luggage.

20. The method as in claim 1, wherein said suppliers providing step further comprises notifying said suppliers of a change in the user's destination; and providing said items to said changed destination.

21. The method as in claim 1, wherein said suppliers providing step further comprises notifying said suppliers of a change in the user's time frame; and providing said items within said time frame.

* * * * *